United States Patent Office 3,417,171
Patented Dec. 17, 1968

3,417,171
METHOD OF PRODUCING A FOAMED SOIL-IMPROVING MATERIAL
Hans Eberle, Ludwigshafen (Rhine), and Gerhard Wuttke, Neuhofen, Pfaltz, Germany, assignors to Gruenzweig & Hartmann AG, Ludwigshafen, Germany
No Drawing. Filed Feb. 9, 1965, Ser. No. 431,438
Claims priority, application Germany, Feb. 12, 1964, G 39,829
13 Claims. (Cl. 264—51)

ABSTRACT OF THE DISCLOSURE

A substantially closed-cell, cellular mass containing soil-improving material is produced by forming a mixture of a thermoplastic material, a foaming agent therefor and soil-improving material, subjecting the mixture to a sufficiently high temperature to activate the foaming agent and to an elevated pressure sufficient to cause gelatinization of the thermoplastic material at such temperature while preventing foaming of the foaming agent due to the elevated pressure, the temperature being below the flow point of the thermoplastic material, and extruding the thus-formed mass under simultaneous release of elevated pressure so as to activate the foaming agent due to the release of pressure and to cause thereby foaming of the mass simultaneously with extrusion thereof, whereby an extruded, substantially closed-cell mass is formed which consists essentially of foamed thermoplastic material having the soil-improving material incorporated in the closed cells thereof.

---

The present invention relates to a method of producing a soil-improving material and, more particularly, the present invention is concerned with producing a soil-improving material of the type wherein fertilizers or other soil-improving materials are incorporated in the substantially closed cells of a foamed synthetic thermoplastic material.

Such soil-improving materials consist of a foamed synthetic resin containing a fertilizer or other soil-improving material, whereby the foamed resin consists of a thermoplastic synthetic resin which will not be decomposed when located in the soil and which consists predominantly of closed cells in which the soil-improving materials such as substantially water-free and preferably finely subdivided fertilizers are incorporated in such a manner that their dissolution and release from the closed cell structure is retarded, whereby the solubility of the fertilizer or the like, i.e. the rate at which the same will come in contact with water from the surrounding soil and will be released from the closed cell structure, can be easily controlled by suitably adjusting the proportion of the fertilizer or the like in the cellular structure as well as the porosity and the size of the granules of the foamed thermoplastic material.

It is an object of the present invention to produce foamed soil-improving materials of the type broadly described above in a simple and economical manner.

It is a further object of the present invention to provide a method for producing such foamed soil-improving materials, which method can be carried out in a continuous manner.

It is a further object of the present invention to provide a method of producing foamed soil-improving materials which permits easy control of the rate at which the soil-improving materials will be released from the foamed thermoplastic carrier.

Other objects and advantages of the present invention will become apparent from a further reading of the description and of the appended claims.

With the above and other objects in view, the present invention contemplates a method of producing a substantially closed-cell, cellular mass containing soil-improving material, comprising the steps of forming an intimate mixture of a thermoplastic synthetic material, a blowing agent and soil-improving material and extruding the mixture while simultaneously foaming the same.

Thus, according to the present invention, the foamed soil-improving material may be produced by mixing the preferably finely powdered synthetic thermoplastic resin with a blowing or foaming agent which is incapable of dissolving the thermoplastic resin and which has a relatively low boiling point, such as petroleum ether and n-pentane. Simultaneously or subsequently, fertilizer or other thermoplastic soil-improving material is homogeneously distributed through the mixture, or it is also possible to first mix the pulverulent resin and fertilizer or the like, and thereafter to admix the foaming agent.

The thus formed mixture is then subjected to gelation by being maintained at a temperature below the flow point of the synthetic resin and preferably also below the boiling point at ambient pressure of the foaming agent, while simultaneously subjecting the mixture to a sufficiently high elevated pressure. After gelation, the temperature is further raised to a temperature above the boiling point of the foaming agent, but below the melting point of the thermoplastic resin and in such state extruded under simultaneous release of pressure, for instance extruded into the ambient air so that the pressure is reduced to ambient pressure, whereby simultaneously with the extrusion of the mixture, the same will also be foamed and thus a strand of the foamed thermoplastic resin, containing in its cells the fertilizer or the like, will be formed.

The method of the present invention is carried out by forming as the carrier for the fertilizer or the like a foamed thermoplastic resin body with predominantly closed cells. Foamed materials of this type are well known to those skilled in the art. It is also known that they will not be decomposed or otherwise attacked when incorporated into the soil, but that such foamed thermoplastic bodies will remain in the soil in substantially unchanged condition for very long periods of time. It is also known that upon immersion of such foamed closed-cell thermoplastic bodies in water for periods of years, substantially no water or only a very small proportion of water is taken up by the closed cell, cellular structure. Thus, closed-cell polystyrene bodies will absorb at most 5% by volume of water. It is all the more surprising that it has been found that the attitude of such closed cell, foamed thermoplastic bodies, with respect to the absorption of water by the same, changes when the closed cells thereof contain, for instance, a water-soluble fertilizer.

Without attempting a conclusive scientific explanation of this effect, it could possibly be assumed that the changed behavior of such closed cell thermoplatic bodies is due to complicated osmotic phenomena which cause the introduction of considerable quantities of water into the closed cells while the water-soluble contents of the cells such as the fertilizer progressively are removed from the closed cells and introduced into the surrounding medium such as the soil. Although under the microscope, the foamed thermoplastic material still appears as a polyhedric foam consisting substantially of closed cells and the cell walls do not appear broken, nevertheless, apparently the cell walls become to a certain degree water-permeable when water-soluble materials such as fertilizer are incorporated in the cells.

These findings permit to reduce in a controllable manner the solubility of the fertilizer or the like. The apparent water-permeability of the foamed thermoplastic material increases when the proportion by weight of the fertilizer contained therein is increased. Furthermore, the solubility of the fertilizer is decreased by reducing the weight per unit of volume of the cellular thermoplastic body and thereby increasing its porosity, while maintaining an unchanged ratio by weight between the thermoplastic cellular body and the fertilizer contained in the cells thereof. In addition, the size of the fertilizer or the like particles within the cells of the foamed thermoplastic body influences the rate of dissolution of the fertilizer. With increase in the size of the individual fertilizer grains, the solubility of the same will be reduced. Furthermore, it is also possible in such cases wherein the water solubility of the contents of the closed cells and thus the rate of withdrawal of such contents from the cells is to be further reduced, to achieve this purpose by adding to the foamed material prior to foaming thereof, hydrophobic agents such as silicones, stearates, wax, or the like. It is also possible to incorporate emulsifiers or wetting agents in the foamable thermoplastic material, for instance in order to achieve a better distribution of oily soil-improving agents which may be distributed through the cellular body.

To a certain degree, also the specific type of thermoplastic resin, of which the cellular body is formed, will affect the solubility of the fertilizer which is incorporated in the foamed material. Generally, all commercial thermoplastic synthetic resins may be utilized in the method of the present invention. These include polyethylene, polyvinyl chloride and polyacrylic acid esters. However, due to their excellent foamability, polystyrenes are particularly suitable. It is, however, also possible to utilize copolymerizates of styrene, which are known per se, for instance copolymerizates of styrene with acrylonitrile or vinyl chloride, or mixtures of different synthetic resins, for instance mixtures of polystyrene and of a styrene-vinyl chloride copolymer, or of polystyrene and polyethylene, or to add to the synthetic resin, in a manner known per se, monomeric substances, polymerization catalysts, hardeners, cross-linking agents, and the like.

All kinds of fertilizers may be incorporated in the foamed material. It is particularly advantageous to incorporate such materials, which are highly effective fertilizers and which, however, when directly incorporated into the soil, due to their high rate of dissolution, might cause harm to vegetation or might lead to great losses, so that these types of highly effective fertilizers could be used only to a limited extent. Fertilizers of this kind include urea and derivatives thereof.

It is also possible, additionally, to incorporate into the foamed material which is produced in accordance with the method of the present invention, a great variety of active materials which affect the metabolism, growth, or protection of the plants. Such substances include trace elements in the form of boron, copper, magnesium, iron compounds or the like, as well as pesticides, herbicides, fungicides and insecticides, and also growth controlling substances such as indoleacetic acid, gibberellic acid, meso-inositol, and many others. It is also possible to include in the mixture which is to be foamed, materials which will influence bacteria growth and humus formation, such as peat, bran, wood flour, and the like. Furthermore, pigments or other dyestuffs may be incorporated in order to allow identification of the foamed material, and also to improve the absorption of, for instance, heat rays.

It is one of the advantages of the foamed soil-improving material which may be produced according to the process of the present invention, that all additives such as the fertilizer are contained therein in water-free condition. This further reduces the solubility of the fertilizer or the like, improves its storability and facilitates handling.

Sometimes it is advantageous, and within the scope of the method of the present invention, to cover the extruded body of fertilizer or the like-containing foamed thermoplastic material with a layer of synthetic resin, for instance, the same thermoplastic material, which may be a thin solid layer forming a skin on the extruded cellular body, or which may be a cellular layer, however, free of fertilizer or the like. The thickness, degree of porosity and composition of this cover layer will also influence the rate of dissolution of the fertilizer or the like contained in the cells of the thus covered cellular body, and the rate at which such fertilizer or the like will be conveyed into the surrounding soil.

The method of the present invention can be easily carried out in a continuous manner.

By extruding a strand of the foamed soil-improving material, a flowable and foamable gel can be formed at relatively very low temperatures and then foamed. Thus, the method of the present invention permits also the incorporation of heat sensitive materials, such as urea, into the cells of the foamed thermoplastic body, without causing decomposition of such heat sensitive material. By introducing the fertilizer or the like into the synthetic resin, so as to form a mixture prior to foaming of the synthetic resin, an even distribution of the fertilizer or the like in the foamed material can be easily achieved.

The method of the present invention can be carried out in a variety of extrusion presses, however, an extruder forming a strand or rope of extruded material is preferred. Such extruder can be operated in a continuous manner and it is not necessary to melt the synthetic material in the apparatus by means of heat in order to obtain a flowable and foamable gel. Gel formation of the thermoplastic material will take place according to the method of the present invention at relatively very low temperatures such as temperatures which may be as low as 30° C., even if fertilizer or the like in an amount which is a multiple of the weight of the synthetic resin has been admixed to the latter. This is possible due to the pressure exerted in the strand or rope extruder.

According to the present invention, the pulverulent thermoplastic material is mixed with a conventional amount, equal to about 5–15% by weight of the synthetic resin, of a liquid foaming agent such as petroleum ether or n-pentane. Simultaneously or subsequent thereto, the fertilizer or other soil-improving materials are admixed, or a first mixture is produced of the synthetic thermoplastic resin powder and the fertilizer or the like and the foaming agent is subsequently admixed thereto. The intimate non-foamable mixture of the starting materials passes then at room temperature along the major portion of the screw conveyor of the extruder without any substantial compacting of the mixture. The terminal portion of the screw conveyor leading towards the extrusion nozzle is so constructed as to cause compression of the mixture passing therethrough at an elevated pressure and at a temperature which is below the plastic range of the pure synthetic resin. Thereby a flowable gel is formed. During the passing of the mixture from the compressing portion of the screw conveyor towards the end of the screw conveyor in the vicinity of the extrusion nozzle, the pressure and temperature are to rise further until the temperature finally reaches the plastic range of the thermoplastic resin while, however, staying below the melting point or range of the resin. In this condition, the gel reaches the extrusion nozzle and is extruded therethrough in the form of a strand, rod or rope, under simultaneous foaming of the same. The thus formed strand or rope of foamed material may be immediately cut or comminuted into a granular mass.

In the context of the present invention, thermoplastic material or resins are to be understood as encompassing synthetic resins which upon heating will change from a solid to a liquid condition without, particularly in the case of amorphous resins, having a narrowly defined melting point. The change from solid to liquid condition takes place gradually. Upon initial heating, the synthetic resin passes from solid condition into a freezing or softening range which represents the upper temperature limit for the general utilization of the synthetic resin. Upon further heating a thermo-resilient state is reached in which the synthetic resin possesses rubber-like resilient qualities. Then follows the plastic range in which an elastic-viscous flow is reached. Finally, upon further heating, the thermoplastic condition of the synthetic resin is reached in which the synthetic resin consists of a more or less viscous melt.

In the case of the styrene-polymerizates which are preferred according to the present invention, gel formation will take place below the thermo-resilient range at temperatures of between 30 and 80° C. The foamable gel is then foamed at a temperature which should not be higher than 120° C., i.e., within the plastic range and below the thermoplastic range or truly molten state of the thermoplastic synthetic material.

The porosity of the foamed material can be increased by increasing the proportion of foaming agent in the mixture and/or by increasing the foaming temperature.

Furthermore, the method of the present invention also contemplates to extrude around the extruded foamed strand of fertilizer-containing synthetic thermoplastic material a sleeve of solid or foamed synthetic material, preferably thermoplastic material, which sleeve will adhere to the core portion formed by the strand of foamed fertilizer-containing synthetic thermoplastic material. By forming such cover or sleeve, the rate of migration of the fertilizer or the like from the cells of the cellular core into the surrounding soil will be further retarded.

By extrusion, in accordance with the present invention, the foamed fertilizer-containing materials were produced which are described in the following examples, the invention, however, not being limited to the specific details of the examples.

Example 1

100 parts by weight of finely pulverulent polystyrene were intimately mixed with 10 parts by weight of n-pentane ("Merck," free of aromatics, boiling point 36° C.) and 100 parts by weight of conventional fertilizer in powder form, for instance, of one of the types available under the trade name "Nitrophoska" from BASF, Inc., New York, and containing nitrogen, phosphorous and potassium. A homogeneous mixture of the above constituents is compressed at a temperature of between 30 and 40° C. and at a pressure of about 150 kp./cm.$^2$, whereby gel formation takes place. The temperature is then raised to about 100° C. while the pressure is maintained and the gel is then extruded into the atmosphere through a square nozzle having an opening of 2×5 mm. The strand of foamed material formed in this manner consists primarily of closed cells which contain the fertilizer, and has a cross sectional area of 20×12 mm. and a weight per volume of about 100 kp./m$^3$.

Example 2

The process of Example 1 is repeated; however, the amount of fertilier is increased to 200 parts by weight.

The thus formed strand of foamed material has a cross sectional area of 10×5 mm. and a weight per volume of about 300 kp./m.$^3$ Example 3

The process of Example 2 is repeated; however, the amount of pentane is increased to 15 parts by weight and in this case the weight per volume of the foamed material is found to be 200 kp./m.$^3$ Example 4

The process of Example 1 is repeated, however, with 400 parts by weight of the same fertilizer.

The extruded strand or rope of foamed material has a cross sectional area of 8×3 mm. and a weight per volume of 800 kp./m.$^3$ The foamed materials produced according to Examples 1–4 were then tested by immersion for 60 hours in distilled water of 20° C.

It was found that the foamed material of Example 1 absorbed 250% by weight of water while 5% by weight of fertilizer were leached out of the foamed material.

Under similar conditions, the water absorption of the foamed material produced according to Example 2 was about 60% by weight and the amount of fertilizer leached out of the foamed material was about 15% by weight.

Under the same conditions, 60% by weight of the fertilizer were leached out of the foamed material of Example 4, whereas the material of Example 3 lost 8.8% by weight.

Similar experiments and tests with substantially corresponding results were carried out with urea as the fertilizer, and foamed bodies having a weight per volume of between 30 and 600 kp./m.$^3$ were produced.

The thus produced soil-improving materials containing closed cell synthetic thermoplastic materials have excellent storability and do not tend to produce dust. Even when a granular mass of such fertilizer or the like containing closed cell, cellular thermoplastic material is stored in contact with hygroscopic materials or exposed to moist air, no agglomeration or lumping of the foamed granules takes place.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of producing a substantially closed-cell, cellular mass containing soil-improving material, comprising the steps of forming a mixture of thermoplastic material, a foaming agent therefor and soil-improving material; subjecting the thus-formed mixture to a temperature sufficient to activate said foaming agent and to an elevated pressure sufficient to cause gelatinization of said thermoplastic material at said temperature while preventing foaming due to said elevated pressure, said temperature being below the flow point of said thermoplastic material; and extruding the thus-formed mass under simultaneous release of elevated pressure so as to activate said foaming agent due to said release of pressure and to cause thereby foaming of said mass simultaneously with extrusion of the same, thereby forming an extruded, substantially closed-cell mass consisting essentially of the thus-foamed thermoplastic material having said soil-improving material incorporated in the closed cells thereof.

2. A method of continuously producing a substantially closed-cell, cellular mass containing a substantially water-free fertilizer, comprising the steps of continuously forming a mixture of thermoplastic material, a foaming agent therefor and substantially water-free fertilizer; continuously subjecting successive portions of the thus-formed mixture to a temperature sufficient to activate said foaming agent, and to an elevated pressure sufficient to cause gelatinization of said thermoplastic material at said temperature while preventing foaming due to said elevated pressure, said temperature being below the flow point of said thermoplastic material; and continuously extruding the thus-formed mass under simultaneous release of said elevated pressure so as to activate said foaming agent due to said release of pressure and to cause thereby foaming of said mass simultaneously with extrusion of the same, thereby forming an extruded, substantially closed-cell mass consisting essentially of the thus-formed thermoplastic material having said fertilizer incorporated in the closed cells thereof.

3. A method of producing a substantially closed-cell, cellular mass containing soil-improving material, comprising the steps of forming a mixture of finely subdivided thermoplastic material, a foaming agent therefor incapable of dissolving said thermoplastic material, and soil-improving material; subjecting said mixture to a temperature below the flow point of said thermoplastic material and to an elevated pressure sufficiently high to cause gelatinization of said thermoplastic material; and extruding the thus-heated mixture at an elevated temperature below the melting point of said thermoplastic material but at least equal to the activation temperature of said foaming agent and under simultaneous release of said elevated pressure so as to cause foaming of said thermoplastic material simultaneously with extrusion of said mixture, so as to form an extruded, substantially closed-cell mass consisting essentially of the thus-foamed thermoplastic material having said soil-improving material incorporated in the closed cells thereof.

4. A method of producing a substantially closed-cell, cellular mass containing soil-improving material, comprising the steps of forming a mixture of finely subdivided thermoplastic material, a relatively low-boiling foaming agent therefor incapable of dissolving said thermoplastic material, and soil-improving material; subjecting said mixture to a temperature below the flow point of said thermoplastic material and to an elevated pressure sufficiently high to cause gelatinization of said thermoplastic material; raising the temperature to at least the boiling point of said foaming agent but below the melting point of said thermoplastic material; and extruding the thus-heated mixture under simultaneous release of said elevated pressure so as to cause foaming of said thermoplastic material simultaneously with extrusion of said mixture, so as to form an extruded, substantially closed-cell mass consisting essentially of the thus-foamed thermoplastic material having said soil-improving material incorporated in the closed cells thereof.

5. A method of producing a substantially closed-cell, cellular mass containing soil-improving material, comprising the steps of introducing into an extrusion device at ambient pressure and temperature a mixture of finely subdivided thermoplastic material, a foaming agent therefor incapable of dissolving said thermoplastic material, and soil-improving material; subjecting said mixture while the same passes through the extrusion device to increasing temperatures and pressures so as to cause gelatinization of said thermoplastic material and to reach the plastic range of said thermoplastic material immediately prior to discharge thereof from said extrusion device and to reach the temperature at which said foaming agent is activatable at a pressure below the maximum pressure to which said mixture is subjected while passing through said extrusion device; and extruding a strand of the thus-formed mass from said extrusion device under simultaneous release of said elevated pressure, thereby activating said foaming agent and forming a substantially closed-cell mass consisting essentially of the thus-foamed thermoplastic material having said soil-improving material incorporated in the closed cells thereof.

6. A method of producing a substantially closed-cell, cellular mass containing soil-improving material, comprising the steps of forming a mixture of finely subdivided polystyrene, a relatively low-boiling foaming agent therefor incapable of dissolving said polystyrene, and soil-improving material; subjecting said mixture to a temperature between 30 and 80° C. being below the flow point of said polystyrene and to an elevated pressure sufficiently high to cause gelatinization of said polystyrene; raising the temperature to at least the boiling point of said foaming agent but below the melting point of said polystyrene, the thus raised temperature not exceeding about 120° C.; and extruding the thus-heated mixture under simultaneous release of said elevated pressure so as to cause foaming of said polystyrene simultaneously with extrusion of said mixture, so as to form an extruded, substantially closed-cell mass consisting essentially of the thus-foamed polystyrene having said soil-improving material incorporated in the closed cells thereof.

7. A method of producing a substantially closed-cell, cellular mass containing soil-improving material, comprising the steps of forming a mixture of finely subdivided polystyrene, a relatively low-boiling foaming agent therefor selected from the group consisting of petroleum ether and n-pentane incapable of dissolving said polystyrene, and soil-improving material; subjecting said mixture to a temperature between 30 and 80° C. being below the flow point of said polystyrene and to an elevated pressure sufficiently high to cause gelatinization of said polystyrene; raising the temperature to at least the boiling point of said foaming agent but below the melting point of said polystyrene, the thus raised temperature not exceeding about 120° C.; and extruding the thus-heated mixture under simultaneous release of said elevated pressure so as to cause foaming of said polystyrene simultaneously with extrusion of said mixture, so as to form an extruded, substantially closed-cell mass consisting essentially of the thus-foamed polystyrene having said soil-improving material incorporated in the closed cells thereof.

8. A method of producing a substantially closed-cell, cellular mass containing soil-improving material, comprising the steps of continuously introducing into an extrusion device at ambient pressure and temperature a mixture of finely subdivided thermoplastic material, a foaming agent therefore incapable of dissolving said thermoplastic material, and soil-improving material; continuously subjecting said mixture while the same passes through the extrusion device to increasing temperatures and pressures so as to cause gelatinization of said thermoplastic material and to reach the plastic range of said thermoplastic material and the point at which said foaming agent is activatable when exposed to a pressure below the maximum pressure to which said mixture is subjected while passing through said extrusion device; continuously extruding a strand of the thus formed mass from said extrusion device under simultaneous release of said elevated pressure, thereby forming a substantially closed-cell mass consisting essentially of the thus-foamed thermoplastic material having said soil-improving material incorporated in the closed cells thereof; and comminuting the thus-formed foamed strand into a granular mass.

9. In a method according to claim 4 the step of adjusting the proportion of the foaming agent in said mixture so as to obtain a desired degree of porosity of the foamed closed-cell mass.

10. In a method according to claim 4 the step of adjusting said elevated temperature so as to obtain a desired degree of porosity of the foamed closed-cell mass.

11. A method according to claim 4 wherein said mixture is extruded into a strand of soil-improving material containing foamed thermoplastic material and simultaneously therewith a tubular layer of thermoplastic material free of said soil-improving material is extruded so as to cover and adhere to said strand.

12. A method according to claim 4 wherein said mixture is extruded into a strand of soil-improving material containing foamed thermoplastic material and simultaneously therewith a tubular layer of unfoamed thermoplastic material free of said soil-improving material is extruded so as to cover and adhere to said strand.

13. A method according to claim 4 wherein said mixture is extruded into a strand of soil-improving material containing foamed thermoplastic material, and simultaneously therewith a tubular layer of foamed thermoplastic material free of said soil-improving material is extruded so as to cover and adhere to said strand.

References Cited

UNITED STATES PATENTS

| | | | |
|---|---|---|---|
| 2,586,275 | 2/1952 | Toulmin | 264—46 |
| 2,988,441 | 6/1961 | Pruitt | 71—1 XR |
| 3,066,382 | 12/1962 | Zweigle et al. | 264—51 XR |
| 3,110,129 | 11/1963 | Baumann | 71—1 XR |
| 3,158,462 | 11/1964 | Wilson. | |

FOREIGN PATENTS

| | | |
|---|---|---|
| 242,067 | 1/1963 | Australia. |
| 954,069 | 4/1964 | Great Britain. |

JULIUS FROME, *Primary Examiner.*

PHILIP E. ANDERSON, *Assistant Examiner.*

U.S. Cl. X.R.

264—176, 68; 71—1, 64; 264—143; 260—2.5